Feb. 8, 1966  E. B. McMILLAN  3,234,549
ABSORBER FOR RADIO WAVES
Filed March 20, 1961  2 Sheets-Sheet 1

INVENTOR.
Edward B. McMillan
BY Robert S. Crooks
his attorney

Feb. 8, 1966   E. B. McMILLAN   3,234,549
ABSORBER FOR RADIO WAVES
Filed March 20, 1961   2 Sheets-Sheet 2

INVENTOR.
Edward B. McMillan
BY
his attorney

United States Patent Office 3,234,549
Patented Feb. 8, 1966

3,234,549
ABSORBER FOR RADIO WAVES
Edward B. McMillan, Topsfield, Mass., assignor to The McMillan Corporation of North Carolina, Raleigh, N.C., a corporation of North Carolina
Filed Mar. 20, 1961, Ser. No. 97,037
21 Claims. (Cl. 343—18)

This invention relates to an absorber for radio waves, such as may be employed in chambers for the testing of radio and radar antennas.

More particularly, this invention relates to a broadband absorber which is light and portable and which can be employed, without requiring other structural materials, in the construction of antenna test chambers.

In the testing of radio and radar antennas, it is often important to have an environment that does not reflect electromagnetic waves back to the antennas under test. Of course, "free space" is an environment which generally satisfies the requirement of non-reflection. However, it is often not practical, because of weather and other factors, to test antennas outdoors, far from buildings, where effectively free space is readily available. It is often necessary to test antennas indoors, not only for reasons of comfort, but also because certain measuring equipment, power supplies and other facilities are required at the test site. Thus it has become important to provide indoor chambers that can accommodate the antennas under test, and that will not reflect much energy that impinges upon the walls, ceilings and floors of such chambers. Various kinds of absorbing materials have been conceived for use in lining such antenna test chambers, or "free-space rooms." However, such absorbing materials have usually required the support of frameworks or of complete enclosures, to which the absorbing materials could be attached. Such frameworks or enclosures have often been expensive and lacking in flexibility. Such fixed structure rendered the test chambers difficult to re-arrange, or to store when not in use. Moreover, such prior-art absorbing materials have sometimes been unduly bulky, have presented very awkward-shaped and fragile surfaces, and have not provided effective absorption over as wide a band of frequencies or wavelengths as might be desired.

Accordingly, it is an object of this invention to provide a radio-wave absorber that can furnish its own structural support in the fabrication of an antenna test chamber.

It is another object of this invention to provide a radio-wave absorber that is light and portable and that presents a flat, smooth face to the space within the chamber.

It is a further object of this invention to provide a radio-wave absorber that is effective over as wide a band of frequencies or wavelengths as possible.

Briefly, I have fulfilled these and other objects of this invention by providing an absorber comprising a cellular structure wherein at least some of the cell walls of said cellular structure bear lossy material in a distribution such that, as a radio wave enters the absorber, the gross surface density of the lossy material on the cell walls increases in generally the same direction as that of the propagation of the arriving wave. I have also provided, as an optional feature, that at least some of the cells of the cellular structure may contain tapered three-dimensional lossy elements such as lossy pyramids or cones. The cellular structure, with its associated lossy material and elements, may be enclosed in a structural "container" which is smooth, strong, and easy to handle, and which may improve the over-all performance of the absorber.

For a better understanding of the invention, reference will now be made to the following specification, taken in conjunction with the accompanying drawings, wherein.

Figure 9:
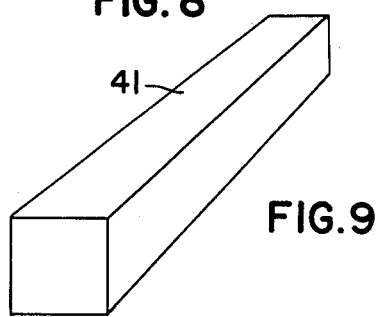
Figure 10:
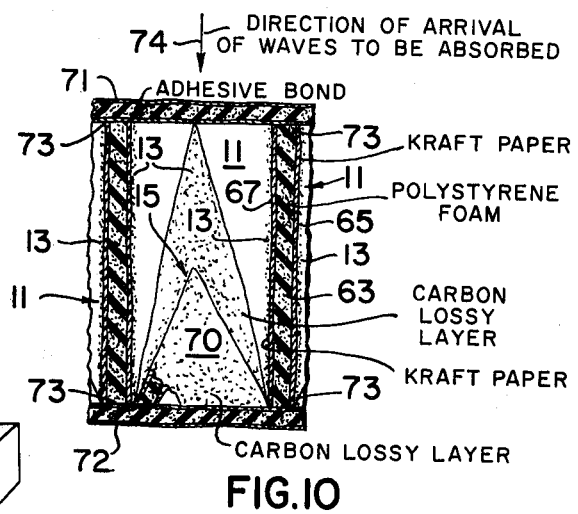

FIG. 9 is a perspective view of a long absorber according to this invention, showing the covered back surface thereof, and displaying the proportions which would be suitable for absorber members to be employed in the ceiling of an antenna test chamber without the need for a separate structural framework to support the absorber members; and FIG. 10 is a side elevational view, partly in section, showing a single complete cell with front and rear walls.

In conventional absorbers composed of arrays of lossy pyramids, it has been found that the height of the pyramids should be at least equal in full to the wavelength of the wave energy to be absorbed, if reasonably good absorption is to be obtained. Hence, if the wavelength is three or four feet, as might be the case in the V.H.F. bands, the pyramids become rather high and unwieldy. Moreover, if such high pyramids are to be employed, and if the amount of material used is not to be unreasonably great, the size of the bases of the pyramids also becomes rather large. Large base size of the pyramids necessarily implies that the apices of the respective pyramids are spaced rather far apart. Unfortunately, a conventional absorber of this type, with the apices of the pyramids spaced excessively far apart, would not give very good absorption performance with waves having wavelengths very small compared with the center spacing between the pyramids. Thus, it would be desirable, in order to improve the performance at relatively short wavelengths, to have the pyramids in this type of absorber not be any larger than necessary.

In the absorber according to my invention, pyramidal lossy elements are employed in combination with cells having lossy coatings on their walls, whereby I have been able not only to optimize the performance for waves of the relatively *short* wavelengths just discussed, but also I have been able to optimize the performance for the relatively long wavelengths more than twice as long as the height of the pyramids. The term "pyramid" as used herein, is intended to include various forms of tapered three dimensional elements generated by a line passing through a fixed point. For instance, conical lossy elements are often employed in absorbers of this type because conical elements, like pyramids, permit a three-dimensional distribution of lossy material which for some purposes satisfactorily approximates a gradient distribution of lossy material in space. It is this gradient distribution of lossy material which is an important factor in achieving good absorption of radio waves.

Figure 1:
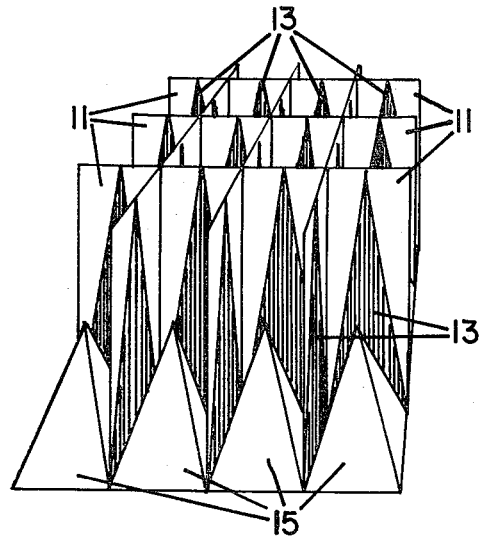
FIG. 1 is a perspective view of one form of cellular structure, with its associated tapered lossy elements, according to my invention.

In the absorber according to my invention, I have been able to optimize the performance at relatively *long* wavelengths by employing a cellular structure that bears on its cell walls a lossy material so disposed as to furnish a gradient distribution of lossy material. Referring to FIGURE 1, I have shown a cellular structure 11 formed of contiguous elongated rectangular walls, and on the walls of which is a triangular distribution of lossy material 13, and within the cells of which are tapered, three-dimensional lossy elements 15. The tapered, three-dimensional lossy elements 15 are, in this particular case, rectangular pyramids, but might also be pyramids having non-rectangular bases, or might be cones or other solids generated by a line passing through a fixed point. Moreover, although cellular structure 11 is rectangular and, hence, suggests the use of a single rectangular pyramid in each cell thereof, it is perfectly possible to employ a plurality of tapered lossy elements in each cell. The tapered lossy elements might even be supported in a matrix of impedance-matching material and might, if desired, take the form of the absorbers disclosed in my U.S. Patent 2,822,539.

In FIGURE 1, I have shown tapered, lossy elements 15 approximately half the height of cellular structure 11. I have found that, if tapered, lossy elements are employed within the cell structure, the tapered lossy elements should be approximately one-half to two-thirds the height of the cell structure. For applications in which the performance at relatively short wavelengths is not critical, I have found that tapered, three-dimensional lossy elements 15 can be omitted and adequate absorption furnished by the distribtuion of lossy material 13 on the walls of cellular structure 11. Generally I prefer to employ both the cellular structure and the tapered, three-dimensional lossy elements, because only thus can performance be optimized at *both* relatively long and relatively short wavelengths.

Figure 3:
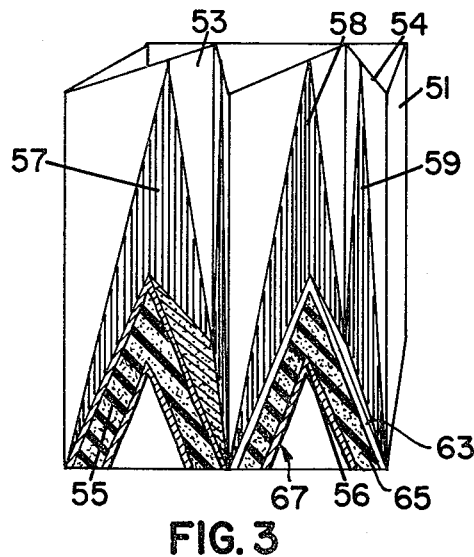
FIG. 3 is a perspective sectional view showing the rear half of two complete cells embodying a modified form of cellular structure wherein the wall members of the cells are obliquely inclined with respect to the mutually perpendicular outer lateral side walls of the absorber.
Figure 5:
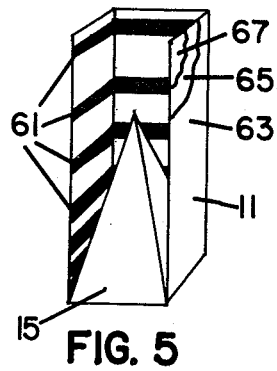
FIG. 5 is a perspective view of a cell with a second pattern of distribution of lossy material on its walls, and including a tapered, three-dimensional lossy element, the view being partly broken away to illustrate the construction of the wall material.

For cellular structure 11, I prefer to employ a dielectric material such as "Fomecor" sandwich board. The "Fomecor" material comprises a layer of polystyrene foam sandwiched between two layers of kraft paper, and is available in thickness of one-eighth inch and one-quarter inch. As an alternative, paper board, plywood, or any other suitable material might be employed. For lossy material 13, I prefer to employ a coating of carbon such as may be obtained by spraying an emulsion of carbon upon the material of the cell walls, employing suitable masks or templates to obtain the desired distribution. In FIGURE 1, the distribution of lossy material 13 on each cell wall is triangular in shape, thereby producing a "linear" gradient of distribution of lossy material. I prefer to employ a coating of lossy material between .005 inch and .007 inch thick, thereby producing a surface resistivity of approximately 100 ohms per square measured between two opposite sides of the square. Cellular structure 11 may conveniently be bonded to a base board, which also serves to support tapered, hollow three-dimensional lossy elements 15 formed of sandwich board 63, 65, 67 as shown in FIGS. 3 and 5. A flat cover, not shown, may be bonded to the front face (shown as the top of cellular structure 11 in FIGURE 1) by means of any suitable adhesive. Thus the rigid combination of cellular structure 11 with a front cover and a back cover produces a rigid "building block" that not only can be self-supporting but also can be load-bearing. It is possible to use this type of absorber, when faced with plywood or some other strong material, as the floor material in an antenna test chamber. Furthermore, "blocks" of this absorber can be stacked up, with their front faces toward the interior, to form the walls of the antenna test chamber, and other "blocks" of absorber can be laid across the tops of the walls to form the ceiling of the chamber. In the ceiling of the chamber, of course, the absorber would be so oriented that the apices of the lossy material 13 and of the tapered, three-dimensional lossy elements 15 face downward toward the interior of the chamber.

Figure 4:
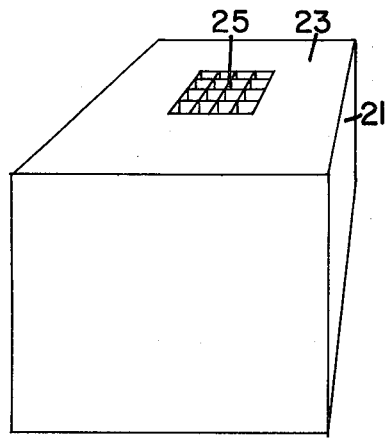
FIG. 4 is a perspective view of an absorber according to my invention, in which one cell of the cellular structure includes a ventilator for through passage of cooling air.
Figure 8:
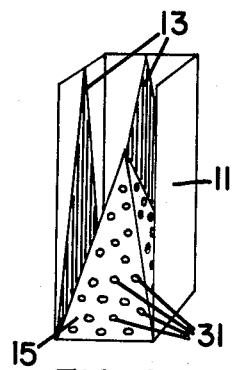
FIG. 8 is a perspective view of a cell with the first pattern of distribution of lossy material on its walls, as shown in FIG. 1, and including a tapered, three-dimensional lossy element which is perforated for ventilation purposes.

FIGURE 4 of the dawings shows a "block" of absorber 21 according to my invention, in which the front surface has a cover 23, and in which one of the cells of the cellular structure has been employed as a ventilating passage capped with a suitable grille 25. For use with waves of comparatively long wavelengths, the cell capped by grille 25 may be operated without containing a large tapered three-dimensional lossy element. However, it is generally preferable to employ a tapered three-dimensional lossy element but to perforate the element the way tapered element 15 in FIGURE 8 is perforated with holes 31 to allow passage of air therethrough. It will be noted that the cell depicted in FIGURE 8 has on its walls a triangular pattern of distribution of lossy material 13 as in FIGURE 1.

The block configuration of absorber 21 shown in FIGURE 4 illustrates the clean appearance that characterizes the absorber of my invention when the cellular structure is enclosed on its top, bottom and sides by the "container" material employed according to this invention. The front cover 23 looks well even when fitted with a ventilator grille 25, which should be of some dielectric material, such as a suitable plastic, in order to minimize the wave reflection therefrom. The "container" material that encloses block of absorber 21 may be dielectric sandwich material such as employed in cellular structure 11. The sheets of material used to form the top, bottom and sides should be securely bonded together at their edges with a suitable adhesive such as the "Elmer's glue" produced and sold by the Borden Company. For sake of appearance and water-repellence, the absorber may be painted on all sides with water-proof white paint.

FIGURE 9 shows a long absorber block suitable for use in bridging across the tops of the test-chamber walls to form the ceiling of the chamber. The surface of the absorber block which appears at the top of FIGURE 9 is the rear surface 41 of the absorber. In a test-chamber ceiling, the front of the absorber would face downward. As a result of the use of "container" material all around the block, and as a result of the use of a back cover over the rear of the cellular structure, it will be noted that the appearance of the absorber block shown in FIGURE 9 is very smooth and clean.

Figure 2:
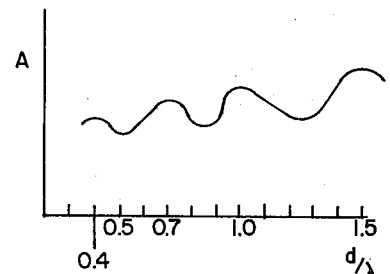
FIG. 2 is a graph illustrating the absorption performance of an absorber according to my invention, as a function of thickness of the absorber relative to wavelength of the radio wave to be absorbed.

The performance of the absorber of this invention is best exemplified by the curve plotted in FIGURE 2. This curve is a representation of the absorptive performance "A" as a function of a variable which is the quotient of the absorber thickness divided by the wavelength of the waves to be absorbed. The absorptive performance is expressed as the number of decibels by which an incident reflected wave exceeds in power the wave resulting from partial reflection of the incident wave by the absorber. The thickness of the absorber "$d$" is approximately the thickness of cellular structure 11. For the purposes of this representation, it is assumed that the height of tapered three-dimensional lossy elements 15 is $d/2$. For any particular value of thickness $d$, the quantity $d/\lambda$ will decrease as the wavelength increases. From the curve of FIGURE 2, it is to be noted that the absorptive action of this absorber is good even for values of $d/\lambda$ less than 0.4. Such improvement over the performance obtainable from prior-art absorbers is attributable to the presence of the cellular structure with its gradient-distributed lossy material. If the cellular structure were not employed, the "hump" that appears in the performance curve at $d/\lambda = 0.4$ would not be present. Instead, the performance would have greatly deteriorated at that point. It is also to be noted that the satisfactory performance indicated at the right-hand end of the performance curve is attributable to the presence of tapered three-dimensional lossy elements the apices of which are *closely enough*

*spaced*, relative to the wavelength, to give good performance at the "higher" frequencies. Without the presence of the cellular structure, it would not be practical to employ tapered lossy elements that had sufficient fineness, or closeness of center spacing.

FIGURE 3 is a broken-away, or sectional, view of an absorber in which the cell walls are obliquely inclined with respect to the outer lateral walls of the absorber rather than being perpendicular or parallel thereto. The sectional view of FIG. 3 is formed by a plane passing midway through the absorber block parallel to its front and rear lateral walls. The complete absorber, one-half of which is shown in FIG. 3, is a cube with an edge length of two feet. The front surface or surface of incidence of the rear half of the absorber illustrated in FIG. 3 is located at the top of FIGURE 3 and has dimensions of two feet by one foot. The absorber is two feet "deep." The complete absorber 51 comprises two cells 53 and 54 which are square in cross section. Cell 53 contains at its base a pyramidal lossy element 55 having a rhomboidal base eight inches on each side and a height of one foot. Cell 54 likewise contains at its base a pyramidal lossy element 56 having a rhomboidal base eight inches on each side and a height of one foot. Cell 53 has lossy material 57 on its various cell walls, each such deposit of material being triangular in configuration with its apex at the surface of incidence. The lossy material is carbon about .006 inch thick and having a surface resistivity of one hundred ohms per square. Cell 54 has lossy material 58 and 59 on the two cell walls that are shown in FIGURE 3. It will be understood that similar lossy material is present on the walls of cells 53 and 54 that are omitted from this sectional view. Pyramids 55 and 56 have coatings of carbon of similar surface resistivity on their various inclined faces. Once again, the structural material of all components of absorber 51 is a sandwich board having polystyrene foam between two layers of kraft paper. Not shown in FIGURE 3 is the front cover used to seal the top or surface of incidence of absorber 51.

FIGURE 5 shows a single-cell portion of cell structure 11 in which the lossy material on the cell walls is distributed in the form of parallel bands of carbonaceous material. The surface of incidence of the cell is located at the top of FIGURE 5. It will be noted that bands 61 are progressively spaced more and more closely together in the direction of penetration of the arriving wave into the absorber, thereby increasing the gross surface conductivity of the cell walls in the direction of wave propagation. This is another way of approximating the gradient of conductivity which was previously described. Tapered lossy element 15 is shown within the cell. In order to illustrate the sandwich material which I have found to be highly desirable for the cell structure of this absorber, I have broken away portions of the corner of the cell of FIGURE 5 to show kraft paper layer 63, polystyrene foam layer 65, and kraft paper layer 67.

Figure 6:
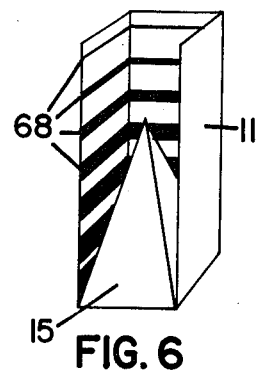
FIG. 6 is a perspective view of a cell with a third pattern of distribution of lossy material on its walls, and again including a tapered, three-dimensional lossy element.

FIGURE 6 shows another type of cell for cell structure 11, in which the lossy material appears in bands that increase in *width* in the direction of propagation of the wave. By progressively increasing the width of bands 68, the gross surface conductivity of the cell walls is increased in the direction from top to bottom of FIGURE 6.

Figure 7:
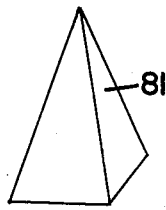
FIG. 7 is a perspective view of a typical tapered, three-dimensional lossy element.

FIGURE 7 shows a typical tapered, three-dimensional lossy element 81 such as may be employed in the absorber of this invention. If the lossy coating is placed on the outer faces of the pyramidal element, and various pyramidal elements are arrayed closely together, the lossy coating may appear to an incoming wavefront to be effectively unbroken. If the lossy coating is placed on the inner faces of the pyramidal element, a certain amount of impedance matching can be achieved by the passage of the incoming wavefront first through the wall structure of the pyramidal element and then into the lossy material itself.

FIG. 10 shows a complete cell with lossy material distributed on the walls 11 in a triangular configuration 13, as described above. The material of the walls 11 is a sandwich material consisting of a central layer 65 of polystyrene foam between two outer layers 63 and 67 of kraft paper. The pyramidal three-dimensional lossy element is covered with a coating 70 of lossy material such as carbon having a surface resistivity of one hundred ohms per square, as described above in connection with FIG. 3.

The absorber of FIG. 10 is shown provided with a front cover 71 and a rear cover 72 bonded to the ends of the walls 11 by a suitable adhesive 73 as previously described. The waves to be absorbed arrive in the direction indicated by the arrow 74.

While in the foregoing specification I have described and illustrated the various forms of my invention which to me presently seem most satisfactory, it will be appreciated that various modifications of these specific embodiments may well be made without departing from the invention. Accordingly, I intend that the scope of my invention be limited only by the following claims.

What I claim as new and desire to secure by Letters Patent of the United States is as follows:

1. An absorber for radio waves, comprising: a cellular structure composed of contiguous elongated rectangular walls, said walls being formed of effectively non-conductive dielectric material, at least some of the cell walls of said structure bearing uniformly electrically conductive lossy material arranged in a geometrical pattern such that the total effective surface density of said lossy material within each cell increases progressively from one end of said cell toward the other end thereof, the waves to be absorbed, upon entering said absorber, traveling from said one end of each of said cells toward said other end thereof.

2. An absorber according to claim 1, further comprising a dielectric cover member extending over said one ends of said cells.

3. An absorber according to claim 1, further comprising a dielectric cover member extending over said other ends of said cells.

4. An absorber according to claim 1, wherein said pattern is triangular with a transversely extending base, the apex of each triangle being oriented toward said one end of each cell.

5. An adsorber according to claim 1, wherein said pattern consists of a series of transverse bands of uniform width, the spacing between adjacent bands decreasing progressively from said one end of each cell toward said other end thereof.

6. An absorber according to claim 1, wherein said pattern consists of a series of transverse bands the widths of which increase progressively from said one end of each cell toward said other end thereof.

7. An absorber according to claim 1, wherein said rectangular walls are formed of sandwich material comprising a central layer of dielectric foam material intermediate two outer layers of paper material.

8. An absorber for radio waves, comprising: a cellular structure composed of contiguous elongated rectangular walls, said walls being formed of effectively non-conductive dielectric material, at least some of the cell walls of said structure bearing lossy material of uniform electrical surface conductivity arranged in a geometrical pattern such that the total effective surface density of said lossy material within each cell increases progressively from one end of said cell toward the other end thereof, the waves to be absorbed, upon entering said absorber, traveling from said one end of each of said cells toward said other end thereof; and a tapered three-dimensional lossy element positioned within at least one of said cells, said element being convergent toward said one end of said cell.

9. An absorber according to claim 8, in which said tapered three-dimensional lossy elements are pyramidal in configuration.

10. An absorber according to claim 8, wherein each of said tapered lossy elements converges to an apex, said apex being located substantially midway between the ends of each cell.

11. An absorber according to claim 8, wherein each of said tapered lossy elements is of pyramidal configuration and is formed of effectively electrically non-conductive dielectric sheet material, the base of each lossy element being located substantially at the other end of the cell within which it is positioned, at least one surface of said sheet material bearing lossy material of uniform surface conductivity, whereby the total effective surface conductivity of said tapered lossy element increases progressively from its apex toward its base.

12. An absorber according to claim 8, wherein at least one of said tapered lossy elements is formed of sheet material, said sheet material having perforations formed therein whereby cooling air may flow longitudinally through the cell in which said perforations are positioned.

13. An absorber according to claim 8, further comprising a plurality of smooth surfaced external walls enclosing said absorber, the one of said walls which extends across said one ends of said cells being formed of effectively electrically non-conductive dielectric sheet material.

14. An absorber according to claim 8, further comprising a plurality of mutually perpendicular wall members laterally enclosing said cellular structure, said elongated rectangular walls being obliquely inclined with respect to said mutually perpendicular walls.

15. An absorber according to claim 8, further comprising a cover member formed of dielectric sheet material extending over at least one of the ends of said cells, said cover member having apertures formed in the portion thereof which extends over at least one of said cells, each tapered lossy element within a cell over which said apertures extend being formed of apertured sheet material, whereby cooling air may pass longitudinally through said last-named cell.

16. An absorber according to claim 8, further comprising a cover member formed of effectively electrically non-conductive dielectric sheet material extending over said one ends of said cells, and adhesive means firmly bonding said sheet material to said cells.

17. An absorber according to claim 8, wherein said rectangular walls and said tapered lossy elements are formed of sandwich material comprising a central layer of dielectric foam material intermediate two outer layers of paper material, said tapered lossy elements being hollow and defining an outer surface generated by a line passing through a fixed point located intermediate the ends of the cell within which said tapered lossy element is positioned.

18. An absorber according to claim 17, in which said fixed point is located substantially midway between the ends of said cell.

19. An absorber according to claim 8, wherein said geometrical pattern is triangular with a transversely extending base, and in which said lossy element is hollow and formed of dielectric sheet material carrying lossy material of uniform surface conductivity.

20. An absorber according to claim 8, wherein said geometrical pattern consists of a series of transverse bands of uniform width, the spacing between adjacent bands decreasing progressively from said one end of each cell toward the other end thereof, and in which said lossy element is hollow and formed of dielectric sheet material carrying lossy material of uniform surface conductivity.

21. An absorber according to claim 8, wherein said geometrical pattern consists of a series of transverse bands the widths of which increase progressively from said one end of each cell toward the other end thereof.

References Cited by the Examiner

UNITED STATES PATENTS 2,977,591  3/1961  Tanner _____ 343—18
2,985,880  5/1961  McMillan.

FOREIGN PATENTS 507,981  12/1954  Canada.
795,510  5/1958  Great Britain.
776,158  6/1957  Great Britain.

CHESTER L. JUSTUS, *Primary Examiner.*

LEWIS H. MYERS, KATHLEEN H. CLAFFY,
*Examiners.*